US008011490B2

United States Patent
Gausman et al.

(10) Patent No.: US 8,011,490 B2
(45) Date of Patent: Sep. 6, 2011

(54) PORTABLE LOW PROFILE DRIVE-OVER TRUCK DUMP CONVEYOR SYSTEM

(75) Inventors: Brent J. Gausman, Morris, MN (US); David K. Evink, Hancock, MN (US)

(73) Assignee: Superior Industries, LLC, Morris, MN (US)

( * ) Notice: Subject to any disclaimer, the term of this patent is extended or adjusted under 35 U.S.C. 154(b) by 0 days.

(21) Appl. No.: 12/928,216

(22) Filed: Dec. 7, 2010

(65) Prior Publication Data

US 2011/0079488 A1 Apr. 7, 2011

Related U.S. Application Data

(63) Continuation of application No. 12/589,573, filed on Oct. 26, 2009, now Pat. No. 7,845,482, which is a continuation of application No. 12/220,754, filed on Jul. 28, 2008, now Pat. No. 7,607,529, which is a continuation of application No. 11/322,133, filed on Dec. 29, 2005, now Pat. No. 7,424,943.

(60) Provisional application No. 60/728,614, filed on Oct. 20, 2005.

(51) Int. Cl.
*B65G 65/02* (2006.01)
(52) U.S. Cl. ........................................ 198/311; 414/398
(58) Field of Classification Search .................. 198/311, 198/550.01, 550.03; 414/347, 353, 376, 414/389, 393, 398, 528, 574, 577
See application file for complete search history.

(56) References Cited

U.S. PATENT DOCUMENTS

| 671,122 | A | 4/1901 | White |
| 1,001,212 | A | 8/1911 | Moore |
| 2,037,860 | A | 4/1936 | Hummel |
| 2,875,888 | A | 3/1959 | Swain et al. |
| 3,291,258 | A | 12/1966 | Twilley |

(Continued)

FOREIGN PATENT DOCUMENTS

CA 2360474 10/2001

(Continued)

OTHER PUBLICATIONS

Brochure for Sudenga Industries, Inc. entitled Hi-Efficiency Series Swing Hopper Auger, Mar. 22, 2005.

*Primary Examiner* — Douglas Hess
(74) *Attorney, Agent, or Firm* — Dicke, Billig & Czaja, PLLC

(57) ABSTRACT

A portable truck dump comprises a conveyor system mounted on an elongate frame to transport material from a first end of the frame to a second, opposite end of the frame. A grate is positioned over the conveyor system and is supported by first and second sides of the frame. A ramp extends generally perpendicular to the frame on each side of the frame next to the grate to provide a drive-over access for a material transport vehicle to deposit its load over the grate and onto the conveyor system. A first end of each ramp immediately adjacent to the frame is pivotally connected to the frame to allow the frame to be articulated towards the grate. A second end of each ramp spaced from the frame is supported above but in close proximity to the ground. A support frame is associated with each ramp for supporting the second end of each ramp. A drive-on ramp contacts an end portion of the support frame.

1 Claim, 9 Drawing Sheets

U.S. PATENT DOCUMENTS

| | | |
|---|---|---|
| 3,552,546 A | 1/1971 | Rath |
| 3,606,050 A | 9/1971 | Silver |
| 3,620,579 A | 11/1971 | Brown |
| 3,708,937 A | 1/1973 | Sterner |
| 3,752,298 A | 8/1973 | Wenger |
| 3,944,054 A | 3/1976 | Ensinger |
| 4,669,674 A | 6/1987 | Oldengott et al. |
| 4,715,488 A | 12/1987 | Hewitt et al. |
| 4,773,521 A | 9/1988 | Chen |
| 4,813,839 A | 3/1989 | Compton |
| 4,881,691 A | 11/1989 | Oldengott et al. |
| 5,297,914 A | 3/1994 | Ash |
| 5,390,777 A | 2/1995 | Gage |
| 5,964,566 A | 10/1999 | Stewart et al. |
| 6,053,284 A | 4/2000 | Fountain |
| 6,186,311 B1 | 2/2001 | Conner |
| 6,238,162 B1 | 5/2001 | Mayer et al. |
| 6,360,876 B1 | 3/2002 | Nohl et al. |
| 6,966,740 B2 | 11/2005 | Mast et al. |
| 7,090,066 B2 | 8/2006 | Kirsch |
| 7,255,198 B1 | 8/2007 | Lo |
| 7,284,947 B1 | 10/2007 | Felton |
| 7,424,943 B2 * | 9/2008 | Gausman et al. .............. 198/311 |
| 7,607,529 B2 * | 10/2009 | Gausman et al. .............. 198/311 |
| 7,845,482 B2 * | 12/2010 | Gausman et al. .............. 198/311 |
| 2005/0123385 A1 | 6/2005 | Kirsch |
| 2005/0167197 A1 | 8/2005 | Logiudice |

FOREIGN PATENT DOCUMENTS

| | | |
|---|---|---|
| CA | 2393119 | 7/2002 |
| GB | 758372 | 10/1956 |
| GB | 2 021 527 | 12/1979 |
| GB | 21876989 | 9/1987 |

* cited by examiner

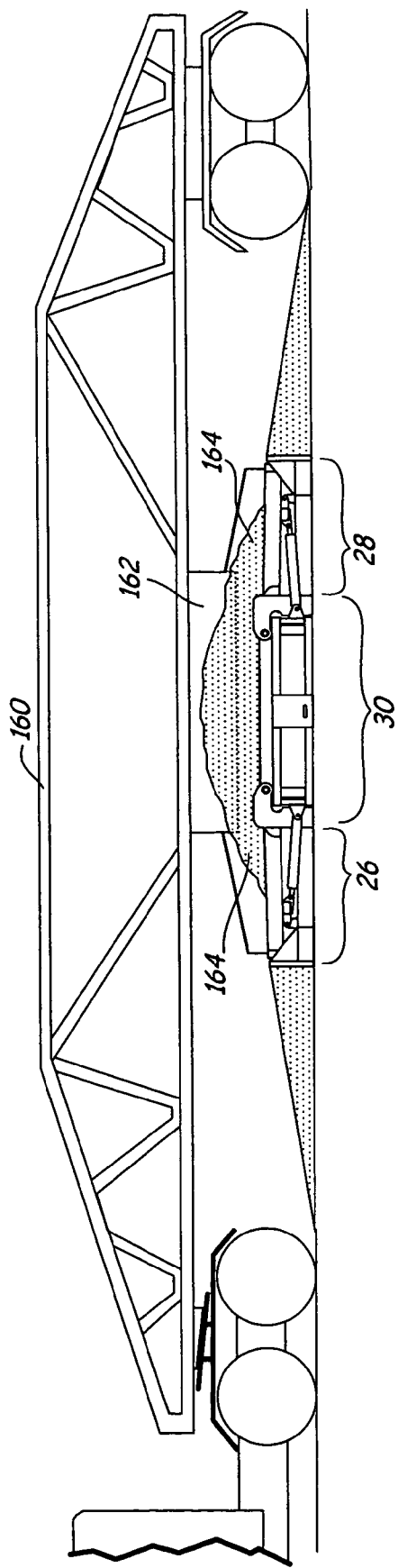
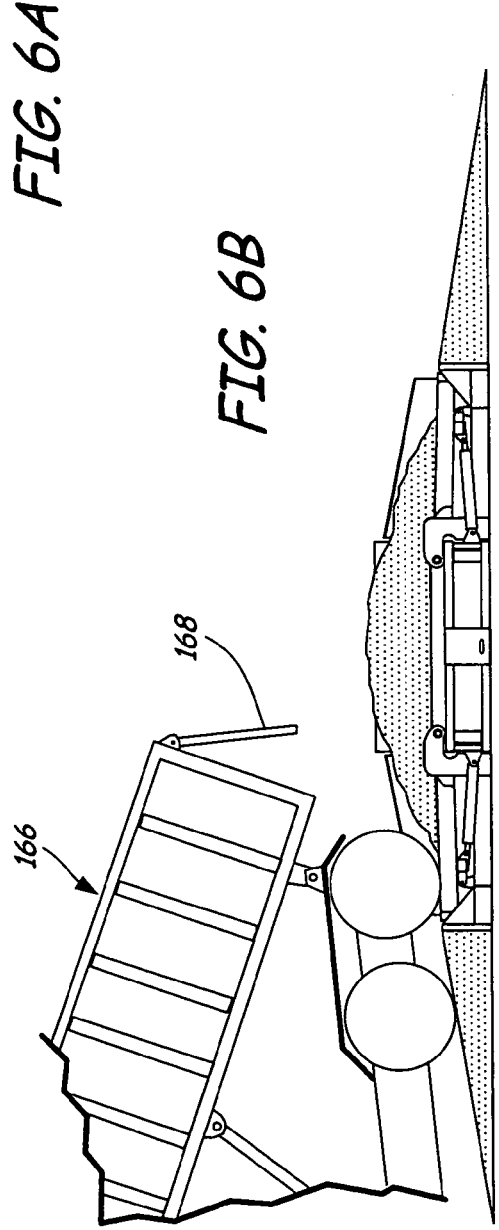

PORTABLE LOW PROFILE DRIVE-OVER TRUCK DUMP CONVEYOR SYSTEM

CROSS-REFERENCE TO RELATED APPLICATION(S)

This is a continuation of U.S. patent application Ser. No. 12/589,573, filed Oct. 26, 2009, now U.S. Pat. No. 7,845,482 which is a continuation of U.S. patent application Ser. No. 12/220,754, filed Jul. 28, 2008, now U.S. Pat. No. 7,607,529, which is a continuation of U.S. patent application Ser. No. 11/322,133, filed Dec. 29, 2005, now U.S. Pat. No. 7,424,943, which claimed priority to provisional patent application Ser. No. 60/728,614, filed Oct. 20, 2005.

BACKGROUND OF THE INVENTION

The present invention relates to material transport vehicle unloading systems, and more particularly, to a portable drive-over truck dump conveyor system with a low profile drive-over ramp.

Material transport vehicle unloading conveyor systems are commonly used whenever there is a need to transport and store materials at a variety of locations. For example, the agricultural and aggregate industries use unloading conveyor systems to transport and stockpile various materials. Conventional unloading conveyor systems include a material deposit hopper that feeds a conveyor system to transport the deposited material to a final destination for stockpiling. The deposit hopper of such unloading systems typically has a height of six feet or more above the ground. Access to the hopper for material transport vehicles is provided by building large earthen ramps on either side of the hopper. The set up time for such unloading conveyor systems requires a large volume of earthen material (e.g., 1,000 cubic yards or more) and time (e.g., ten hours or more) to construct the earthen ramps. As such, conventional unloading conveyor systems are not suited to circumstances requiring periodic relocation of the unloading conveyor, such as road construction projects. There is a need for a material transport vehicle unloading system that is portable, quick and easy to set up, and able to be relocated at minimal cost.

BRIEF SUMMARY OF THE INVENTION

A portable material transport vehicle dump system comprises a longitudinally extending frame that carries a material conveying system generally from a first end of the frame to a second end of the frame. The first end of the frame is in close proximity to a ground surface. A grate is supported by the frame near the first end of the frame so as to be positioned over a portion of the conveying system. A pair of ramps are connected to the frame on opposite sides of and aligned with the grate. Each ramp of the pair of ramps has a first portion that is engageable with the ground surface and a second portion that is supportable above the ground surface. The second portions define, in combination with the grate, a drive over surface for a material transport vehicle when second portions are in a first lowered position. The first portion of each ramp comprises a U-shaped frame having a pair of side frame members and an end frame member connected between the pair of side frame members at an end of each side frame member that is spaced from the longitudinally extending frame. The end frame member defines a height above the ground surface. An end portion of the drive over surface of the second portion of each ramp is positioned adjacent to the end frame member of the U-shaped frame when the second portion of each ramp is in the first lowered position. The second portion of each ramp is pivotable away from the first portion while the first portion remains in contact with the ground surface.

BRIEF DESCRIPTION OF THE DRAWINGS

FIG. 6A is side view of a belly dump material transport vehicle positioned with the belly dump opening over the material receiving area of the conveyor system of the present invention.

FIG. 6B is side view of a rear dump material transport vehicle positioned with the dump opening over the material receiving area of the conveyor system of the present invention.

DETAILED DESCRIPTION

Figure 1:
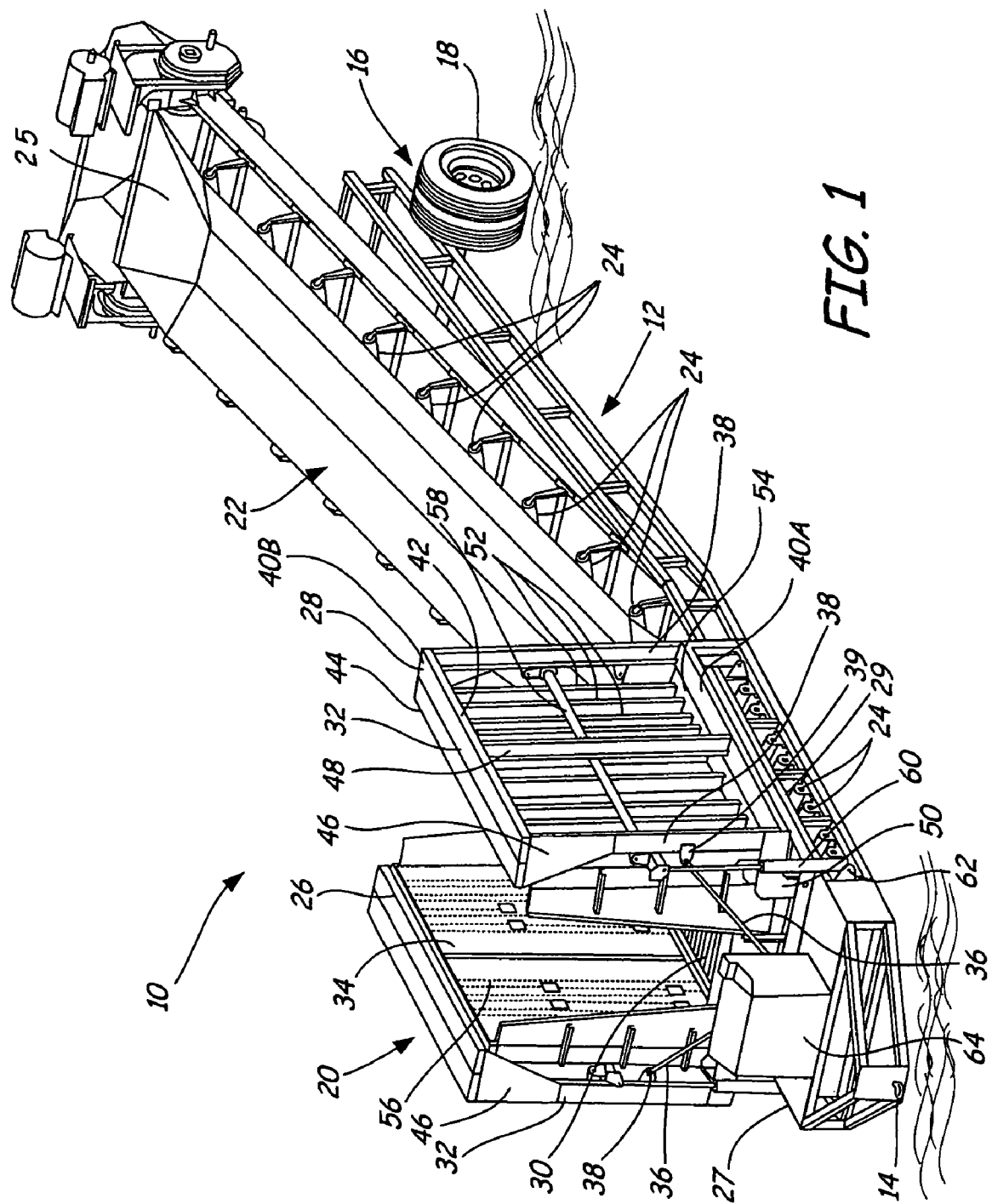
FIG. 1 is a perspective view of one embodiment of a portable drive-over truck dump conveyor system of the present invention.

FIG. 1 is a perspective view of one embodiment of a low profile, portable drive-over truck dump conveyor system 10 of the present invention. Conveyor system 10 is generally comprised of a longitudinally extending frame 12 configured at first end 14 for connection to a towing vehicle and configured at second end 16 with a wheeled axle system 18, which allows conveyor system 10 to be easily transported on a roadway to a desired work site. Wheeled axle system 18 can also be replaced by skids to permit off-road portability of conveyor system 10. Carried by frame 12 adjacent to first end 14 is a drive-over ramp system 20, which as depicted in FIG. 1 is in a raised, stored position for transport of conveyor system 10. Also carried by frame 12 is a conventional endless conveyor belt assembly 22, which generally extends from first end 14 (beneath ramp system 20) to second end 16 and is supported on a plurality of idler rollers 24 mounted to frame 12. Conveyor belt assembly 22 transports material deposited relative to ramp system 20 to a hopper 25 for delivery to subsequent conveyor systems or material transport vehicles (not shown).

The drive-over ramp system 20 is uniquely configured to define a low-profile material deposit access for belly dump and rear dump material transport vehicles. Ramp system 20 generally includes a first ramp section 26 mounted on a first side 27 of frame 12, and a second ramp section 28 mounted on second side 29 of frame 12. Located between first and second ramp sections 26, 28 is a third ramp section 30. Ramp section 30 comprises a grate supported by frame 12, which allows material deposited on ramp system 20 to access the endless conveyor belt assembly 22.

Each ramp section 26, 28 includes a ramp support frame 32 and a ramp 34, which in the embodiment shown are pinned together in a raised and stored position for transport or storage of conveyor system 10. Each ramp section 26, 28 of ramp system 20 may be stabilized in this raised and stored position by connecting the respective ramp section to frame 12, such as with bracing bar 36. In one embodiment bracing bar 36 is connected to each ramp section 26, 28 by providing a flange 39 on, for example, ramp support frame 32.

In one embodiment, each ramp support frame 32 comprises a perimeter of metal frame members that include a pair of side frame members 38 and a pair of end frame members 40A and 40B. End frame member 40B has a height, as measured between lower frame edge 42 and upper frame edge 44, which is greater than the height of end frame member 40A. In one embodiment, end frame member 40B has a height of less than about twenty five inches. In a particular embodiment, end frame member 40B has a height of about twenty two inches. End frame members 40A, 40B are connected to side frame members 38 by welding. A metal gusset 46 is further welded to each side frame member 38 and a respective end portion of end frame member 40B. End frame members 40A and 40B may be stabilized such as by a metal brace 48 connected between frame members 40A, 40B. In the embodiment shown, each ramp support frame 32 is connected to frame 12 by a hinge plate 50 that is welded to each side frame member 38 adjacent to end frame member 40A. Hinge plates 50 are pivotally connected to frame 12. The pivotal connection of ramp support frame 32 provides a convenient way for storing and deploying ramp support frame 32 of each ramp section 26, 28. When conveyor system 10 is set up for unloading material transport vehicles, ramp support frame 32 rests on the ground. Ramp support frame 32 provides two independent functions. First, ramp support frame 32 serves as a low profile support structure for building an earthen ramp to access the ramp system 20. Second, ramp support frame can additionally serve as a stable base to support ramp 34 at a level of end frame member 40B. The present invention contemplates utilizing the first function of ramp support frame 32 alone, or a combination of the first and second function of ramp support frame 32.

Figure 2:
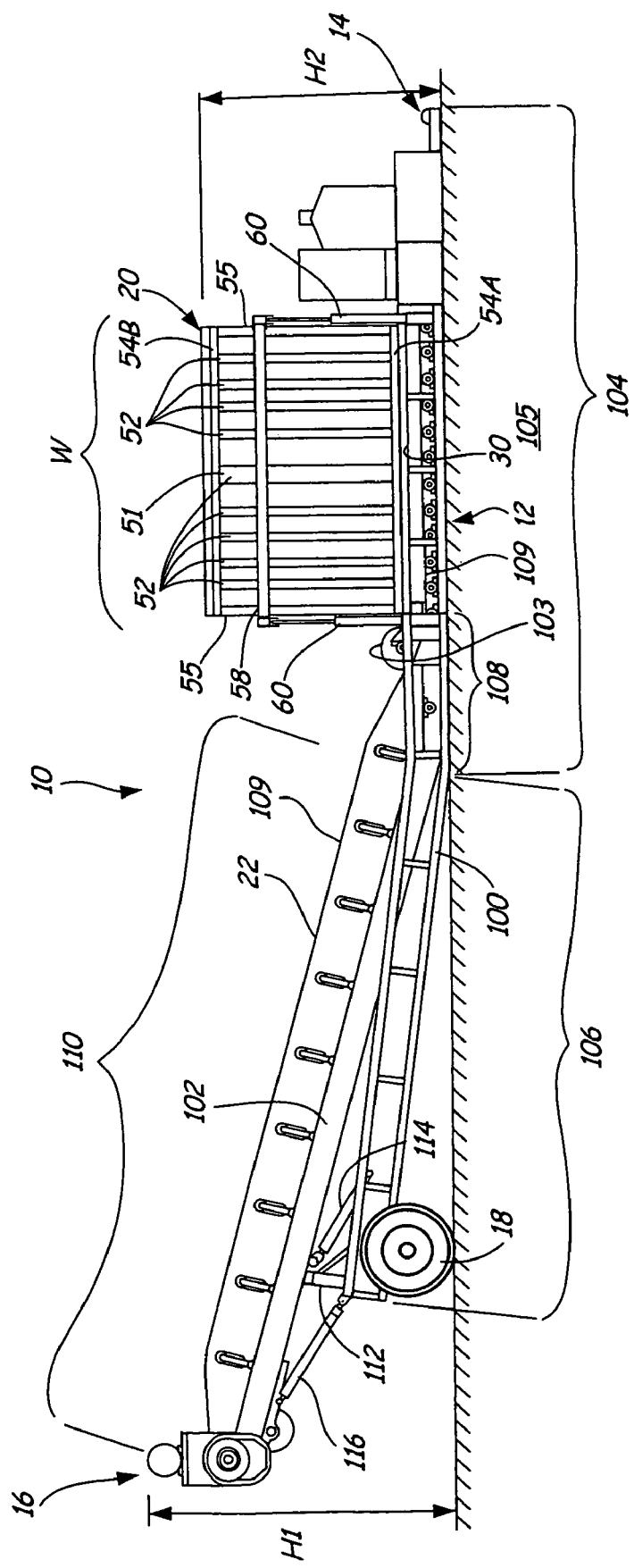
FIG. 2 is a side view of the conveyor system of FIG. 1.

FIG. 2 is a side view of the conveyor system 10 with the ramp support frame 32 removed. As shown in FIGS. 1 and 2, each ramp 34 of ramp system 20 comprises a generally rectangular metal frame 51 which includes plurality of cross-support members 52 connected between opposing end frame members 54A, 54B. Cross-support members 52 are spaced apart relative to the side frame members 55 and to one another to provide support for a metal decking 56. Metal decking 56 is secured to a first surface of the ramp frame 51 and cross-support members 52 by welding. Connected to a second, opposite surface of cross-support members 52 and side frame members 55 is a metal beam 58. Beam 58 has a length greater than a width of ramp 34 and extends generally transverse to cross-support members 52. Opposing ends of beam 58 are connected to one end of a hydraulic cylinder 60, which has its opposite end connected to a flange 62 mounted on frame 12 (FIG. 1). Hydraulic cylinders 60 are connected to a conventional hydraulic system 64 comprising a pump and fluid reservoir carried by frame 12. Hydraulic cylinders 60 are dual actuated hydraulic cylinders which allow ramp system 20 to be raised and lowered relative to the ground in a manner to be described more fully herein.

As shown in FIG. 2, frame 12 of conveyor system 10 is comprised of a first frame section 100, which carries the wheeled axle system 18 and the drive-over ramp system 20, and a second frame section 102, which carries a portion of the conveyor belt assembly 22. First frame section 100 has a first linear portion 104, which is configured to rest flat on the ground 105, and a second linear portion 106, which extends at an angle relative to the first linear portion 104. The first frame section 100 has an exemplary length of about forty three feet. The height of the first linear portion 104 by ramp system 20 is less than about twenty five inches.

The second frame section 102 has a first linear portion shown generally at 108 which is complimentary to first linear portion 104 of the first frame section 102. First linear portion 108 is sized to fit between opposite sides of first frame section 102 and is pivotally connected to the first frame section 102. Second frame section 102 also includes a second linear portion 110 which extends at an angle relative to the first linear portion 108. To assist the conveyor belt of conveyor belt assembly 22 to angularly transition from the second conveyor section 102 to the first frame section 100, a pair of wheels 103 are rotationally mounted relative to first frame section 100 adjacent to the ramp system 20. Wheels 103 engage the upper surface of the conveyor belt 109 to redirect the conveyor belt 109 for travel beneath the third ramp section 30.

The second linear portion 110 rests on a pedestal 112 carried by first frame section 100 when the second frame section 102 is in a first position. In the exemplary embodiment, the height H1 of second end 16 relative to the ground 105 when the second frame section 102 is in the first position is about twelve feet, three inches. The second frame section 102 may be elevated above the pedestal 112 by a pair of hydraulic cylinders 114 mounted between opposite sides of the second linear portion 110 and the second linear portion 106 of the first frame section 100. Adjustable supports 116 are further provided between first frame section 100 and second frame section 102 to assist in stabilizing the second frame section 102 at the height selected. The overall length of first and second frame sections in the exemplary embodiment is about fifty two feet. In the exemplary embodiment, the height H2 of conveyor system 10, as defined by ramp system 20 in the up position, is about nine feet, four inches. Ramp system 20 has a width W of about ten feet, five inches.

Figure 3:
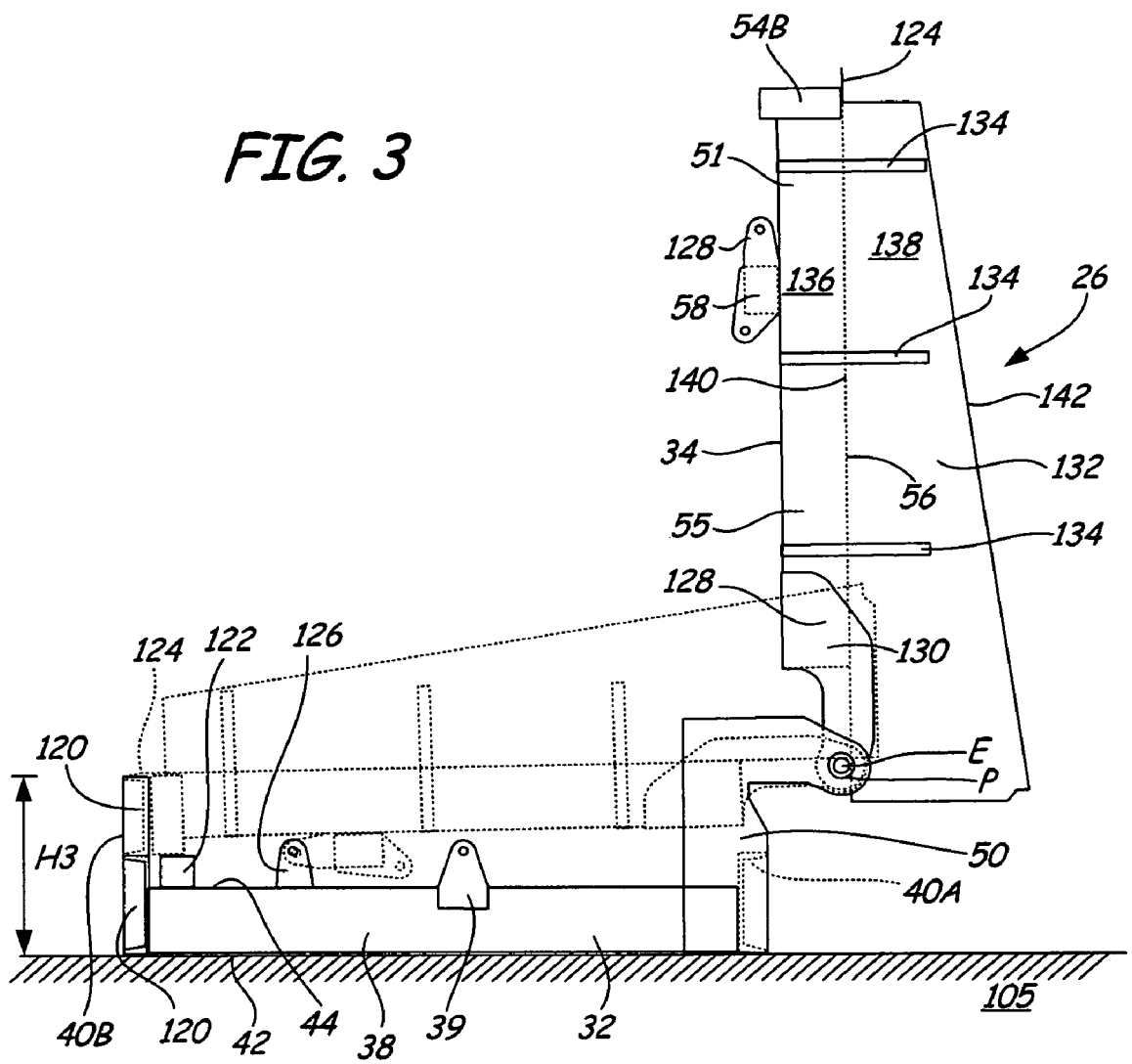
FIG. 3 is a diagrammatic side view of one ramp section of the conveyor system of the present invention.

FIG. 3 is a diagrammatic side view of one ramp section (e.g., ramp section 26) of ramp system 20. As shown in FIG. 3, ramp support frame 32 is positioned with lower frame edge 42 in contact with the ground 105. As previously noted, end frame member 40B has a height greater than end frame member 40A, which in the exemplary embodiment shown is accomplished by connecting two metal beams at their respective ends, such as by welding. Frame member 40B functions as a barrier to create an earthen ramp for material transport vehicles to access ramp system 20. In one preferred embodiment, frame member 40B has a relatively low height H3 above ground 105 such that less material is required to build the earthen ramp than truck dump systems currently known in the art. Also, as such, the preparation, set up time and cost of operating conveyor system 10 is considerably less than existing truck dump systems. Known truck dump systems, for example, require an earthen ramp having a height of six feet or greater, which requires over 1,000 cubic yards of material and approximately 8 to 10 hours to construct. In one example, frame member 40B has a height of about twenty two inches, although other dimensions of frame member 40B that yield a low profile earthen ramp are possible.

As further shown in FIG. 3, ramp support frame 32 may include a metal ramp support beam 122 adjacent to frame member 40B for supporting end frame member 54B of ramp frame 51 when ramp 34 is in a first, lowered position. Support beam 122 extends between side frame members 38 and is secured to the upper frame edge surface 44, such as by welding. Support beam 122 is dimensioned such that a lip 124 of deck 56 lies on the top-most edge surface of end frame member 40B when ramp 34 is resting on beam 122.

Each side frame member 38 of ramp support frame 32 further includes a metal flange 39, as previously discussed, and metal flange 126. Flanges 39 are secured to side frame members 38 such as by welding. Flanges 126 are also secured to side frame members 38 such as be welding and are provided with a through hole for linking ramp support frame 32 to corresponding flanges 128 associated with beam 58 on opposite sides of beam 58, such as with a metal pin. When flanges 126 and 128 are pinned together, ramp support frame 32 can be raised to the raised and stored position (shown in FIG. 1) along with ramp 34. When conveyor system 10 is configured for unloading a material transport vehicle, each ramp section 26, 28 is moved to a second, lowered position with the ramp support frame 32 resting on the ground 105. The metal pins connecting flanges 126 and 128 are then removed, thereby allowing ramp 34 to be raised and lowered independent of the ramp support frame 32.

In the embodiment shown, ramp support frame 32 and ramp 34 are configured to pivot about a common pivotal connection. Each side frame member 55 of ramp frame 51 includes a hinge plate 128 secured to an end portion of the respective side frame member 55, such as by welding. Ramp frame 51 has a width slightly less than a width of ramp support frame 32 such that hinge plates 50 overlap an outer surface 130 of hinge plates 128. The configuration and placement of hinge plates 128 is selected to locate the pivot point P of hinge plate 128 in close proximity to the inward edge E of the metal decking 56 of ramp 34. Pivot point P is located on frame 12 to maintain edge E of metal decking in close proximity to the edge of third ramp section 30 when ramp 34 is in either the raised or lowered position (see e.g., FIG. 1)

Associated with each side frame member 55 of ramp sections 26, 28 is a side wall 132, which extends generally from end frame member 54B to edge E of metal decking 56. Side Wall 132 is secured to side frame members 55 by a plurality of spaced metal braces 134 that are welded to the outer surface 136 of each side frame member 55 and the outer surface 138 of side wall 132. A lower edge 140 of side wall 132 fits close against side frame member 55. The upper edge 142 of side wall is sloped to define the greatest wall height at or near the pivot point P, which corresponds to the area where material is deposited, with the lowest wall height located near the end frame member 54B. Side walls 132 function to retain excess material on the decking 56 of ramp 34 as it is being deposited by a material transport vehicle.

Figure 4:
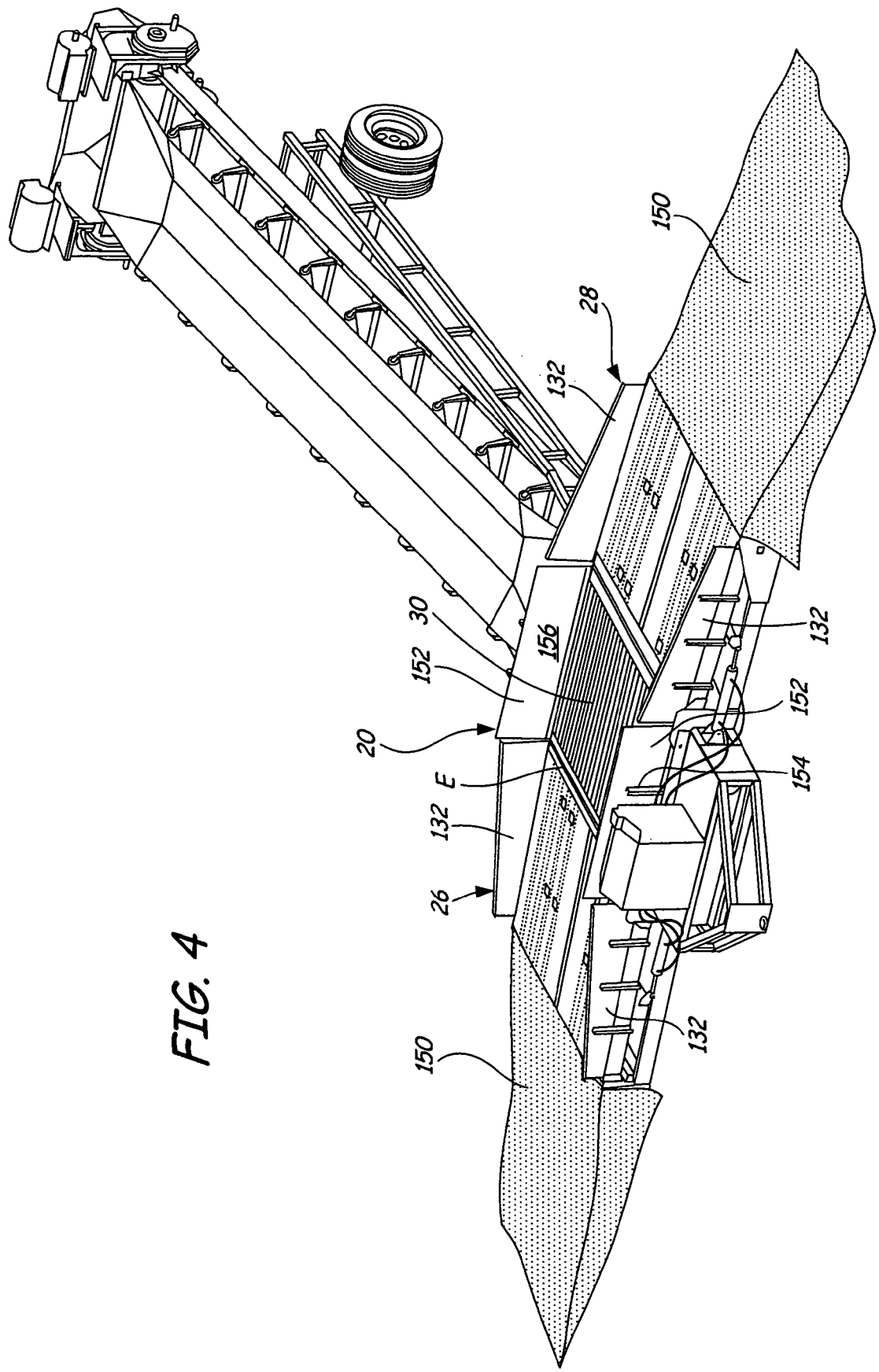
FIG. 4 is a perspective view of the conveyor system of FIG. 1 with the drive-over ramp system in the down position.
Figure 5:
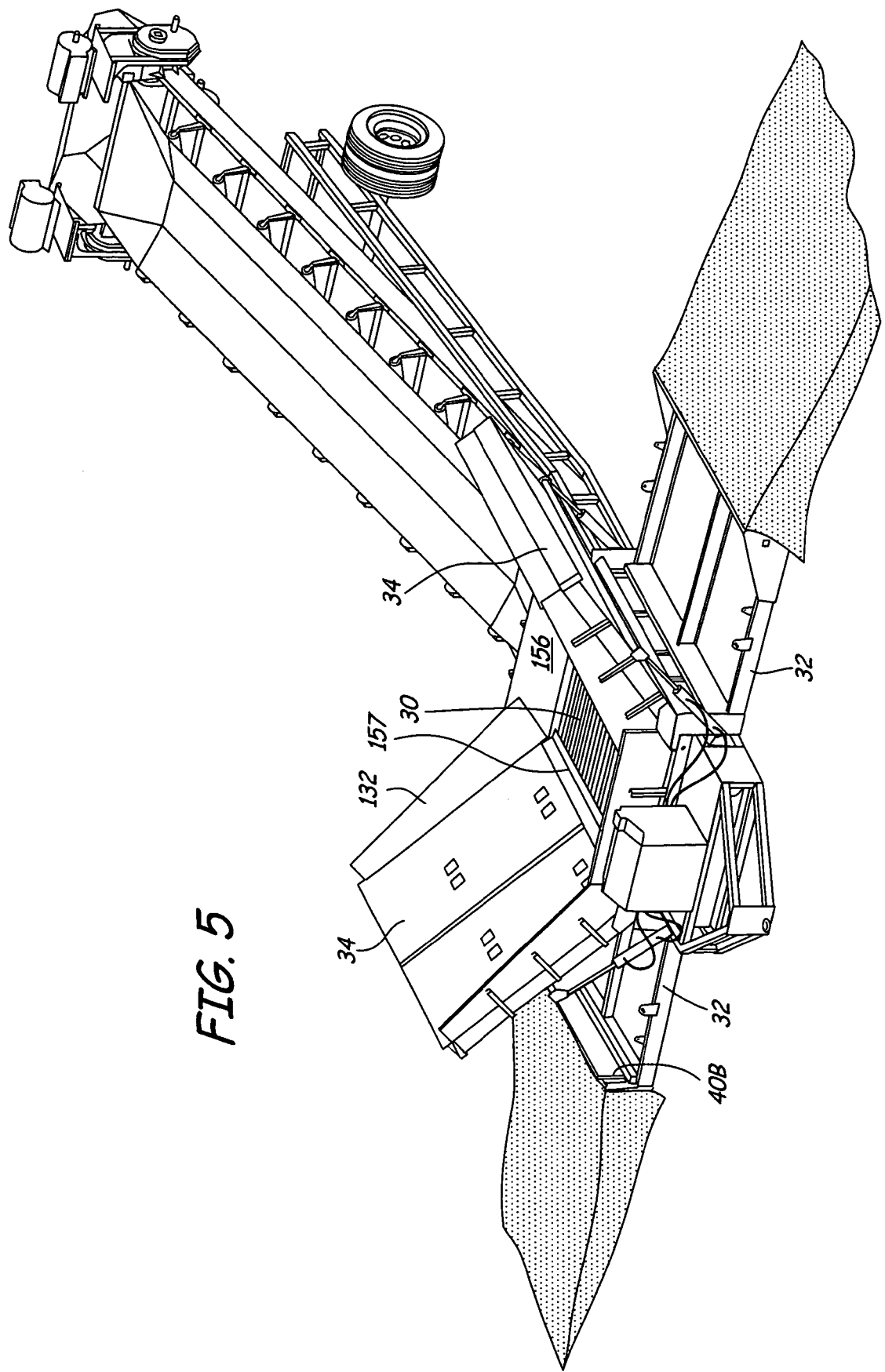
FIG. 5 is a perspective view of the conveyor system of FIG. 1 with the drive-over ramps pivoted toward the material receiving area of the conveyor system.

FIG. 4 is a perspective view of conveyor system 10 with ramp sections 26, 28 is the second, lowered position. With the ramp support frames 32 of each ramp section resting on the ground, earthen ramps 150 are made to slope away from the end frame member 40B of each ramp support frame to allow material transport vehicles to access the drive-over ramp system 20. As further shown in FIG. 4, frame 12 is provided with a pair of side walls 152 adjacent to the third ramp section 30 to retain excess material on ramp system 20 as it is being desposited by the material transport vehicle. Side walls 152 are connected to respective portions of frame 12 by a plurality of metal braces 154 in the manner described relative to side walls 132. Side walls 152 are located to allow the side walls 132 of ramp sections 26, 28 to move between the facing surfaces 156 of side walls 152. As shown in FIG. 5, when ramps 34 are actuated away from the second, lowered position toward the first, raised position, the earthen ramps 150 are not disturbed and remain in contact with the end frame members 40B. Ramp support frames 32 ensure that ramps 34 are consistently supported relative to the ground after the ramps have been moved between the first and second positions.

As further shown in FIG. 5, a flap 157 may be connected to decking 56 along edge E to cover a gap between ramp 34 and the grate of ramp section 30 as ramp 34 is actuated toward the raised position. Flap 157 has a width sufficient to overlap an end portion of the grate and thereby prevent material deposited onto ramp system 20 from accumulating beneath ramp 34. Flap 157 may be a strip of conveyor belt material or any suitable durable and flexible material. Flap 157 may be connected to decking 56 by bolts to permit periodic replacement of the flap as wear occurs.

FIGS. 6A and 6B are end diagrammatic views of the ramp system 20 with side walls 132 and 152 removed demonstrating material being deposited by different types of material transport vehicles. The deposited material is shown in a static position, although it is to be appreciated that the material deposited is being rapidly carried away from the third ramp section 30 by the conveyor belt system 20. As shown in FIG. 6A, ramp system 20 is accessible by a belly-dump style material transport truck/trailer system 160. The belly-dump gates 162 of system 160 are positioned over the ramp system 20 with the gates 162 substantially centered on the third ramp section 30. As shown in FIG. 6A, once the gates 162 are opened, material falls onto the ramp system. The belly-dump gates have a length slightly greater than the width of third ramp section 30. As such, a small portion 164 of material is deposited on the ramp 34 of each ramp section 26, 28. When the portion 164 of material is at a level of the gates 162, the remaining material falling from gates 162 is deposited on the third ramp section 30. The material passes through the grates of section 30 and onto conveyor belt 109 of the moving conveyor belt system 22. Similarly, as shown in FIG. 6B, ramp system 20 is accessible by a rear-dump style material transport vehicle 166. Vehicle 166 is backed onto one ramp 34 until the rear dump gate 168 is adjacent to the third ramp section 30 and the material is then deposited onto the ramp system 20. A substantial portion of the material is directed through the grates of the third ramp section and onto the moving conveyor belt system 20, with some overflow falling on each ramp of ramp sections 26, 28.

Figure 7:
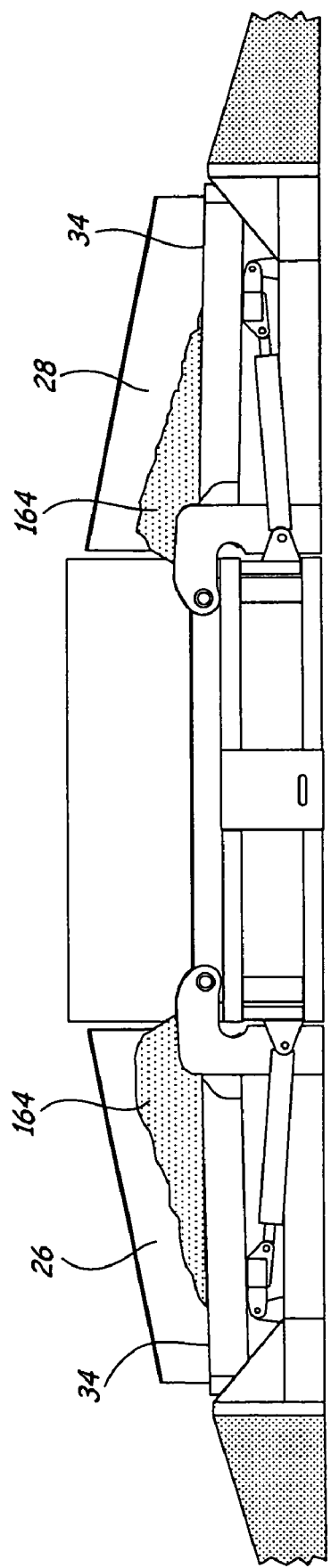
FIGS. 7 and 8 are an end views of the drive-over ramp system of the present invention with the front side walls removed to better illustrate the ramp cleaning operation of the drive-over ramp system of the present invention.
Figure 8:
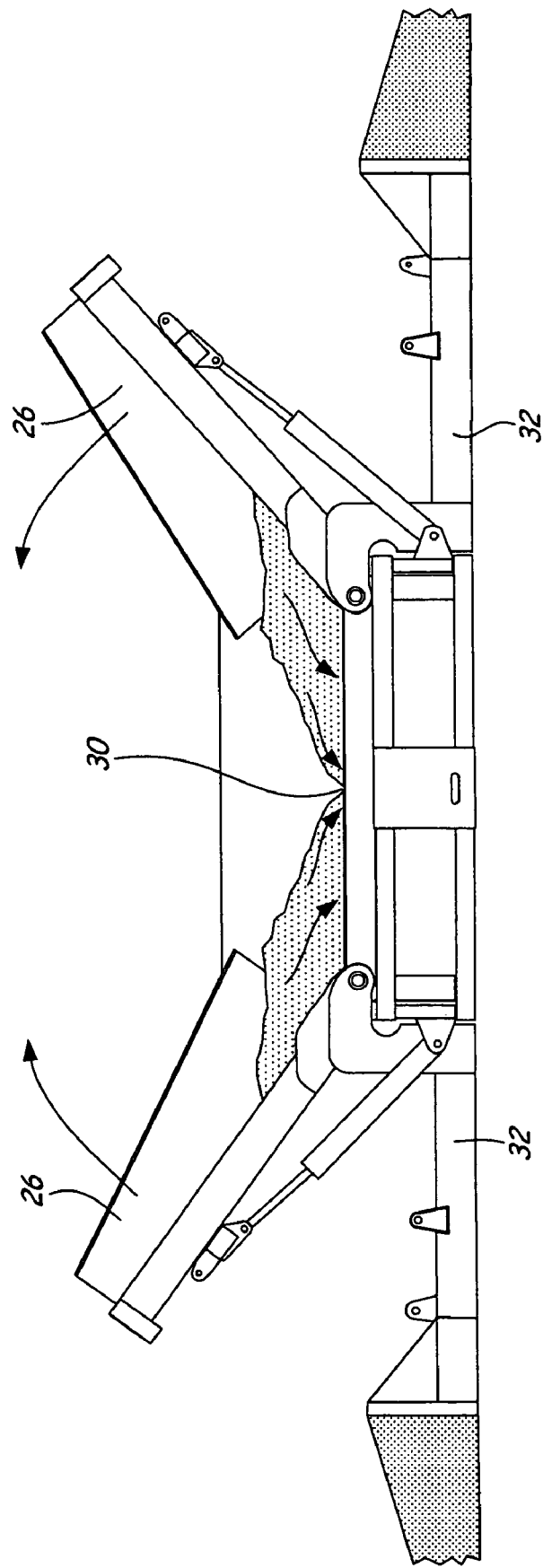

FIGS. 7 and 8 are enlarged end views of ramp system 20 at the conclusion of an unloading operation of a material transport vehicle. As shown in FIG. 7, after the contents of the material transport vehicle have been deposited through the grate of the third ramp section 30, the small portion 164 of material remains on the ramp 34 of each ramp section 26, 28. As shown in FIG. 8, to clear the material off of ramps 34, each ramp section 26, 28 is pivoted away from the ramp support frame 32 until the material is fed into the grate of the third ramp section 30. Ramp sections 26, 28 are then lowered onto the ramp support frames 32 to allow another material transport vehicle to dump its material load.

Figure 9:
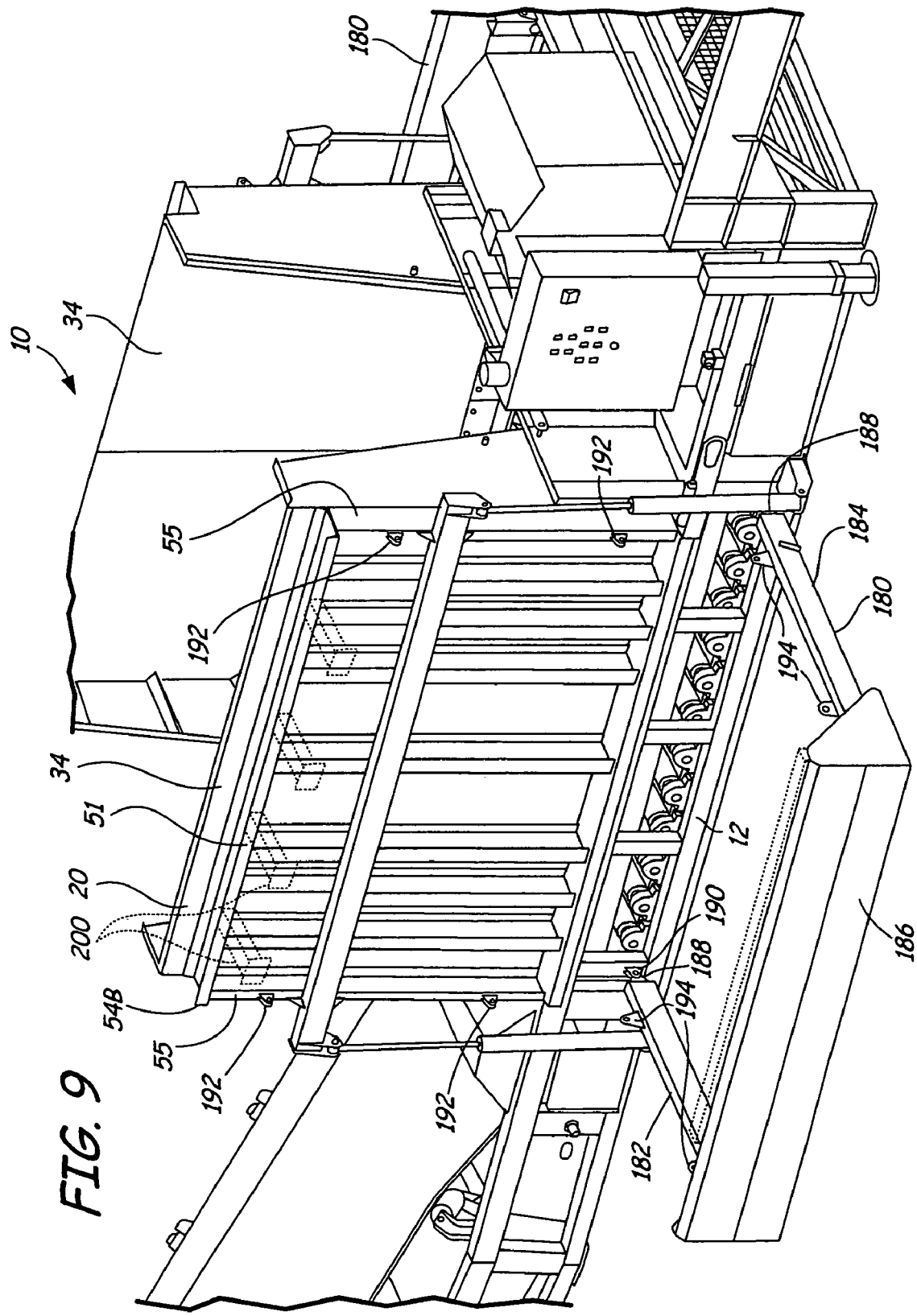
FIG. 9 is a perspective view of a second embodiment of the ramp system of the present invention.

FIG. 9 is a perspective view of a second embodiment of ramp system 20, which employs a pair of ramp support frames 180. Each ramp support frame 180 is generally comprised of side frame members 182, 184 and an end frame member 186. Side frame members 182, 184 extend generally normal to frame 12 of conveyor system 10 adjacent to drive-over ramp system 20 and may have free ends 188 connected to frame 12. Alternatively free ends 188 are maintained relative to frame 12 by virtue of the earthen ramp (not shown) that abuts end frame member 186. As shown in FIG. 9, in one embodiment frame 12 is provided with a pair of spaced flanges 190, each flange 190 have a through hole. The free end 188 of side frame members 182, 184 may be provided with a corresponding flange that is received between flanges 190 and connected with a metal pin. The construction and connection of end frame member 186 to side frame members 182, 184 is substantially identical to ramp support frame 32. Further, in one embodiment, a ramp support beam such as ramp support beam 122 of ramp support frame 32 is located adjacent to end frame member 186 to support the end frame member 54B of ramp frame 51. Alternatively, ramps 34 may be supported by placing a support base on the ground between side frame members 182, 184. A suitable support base may comprise a concrete block or metal beam. Additionally, ramp 34 may be supported relative to the ground by connecting one or more legs 200 to the underside of ramp 34 along and/or adjacent to end frame member 54B. Legs 200 may be height adjustable and removable from the underside of ramp 34.

When it is desired to transport conveyor system 10 to a new location, ramp support frame 180 can be stored relative to each ramp section 26, 28. As shown in FIG. 9, each side frame member 55 of ramp frame 51 is provided with a first and second pair of flanges 192 which align with complimentary flanges 194 mounted on side frame members 182, 184 of ramp support frame 180. Flanges 192 and 194 are provided with complimentary through holes. To secure ramp support frames 180 to ramp sections 26, 28, each ramp 34 is lowered until flanges 194 register between flanges 192 with the respective holes in alignment. Metal pins are then inserted in the holes of flanges 192 and 194. If the free ends 188 of side frame members are connected to frame 12, the free ends are disconnected. Ramp sections 26, 28 can then be raised to the first, stored position along with the ramp support frames 180. Ramp support frames 180 provide another convenient way of deploying and storing a ramp support frame for use with the ramp system of the present invention.

Although the present invention has been described with reference to preferred embodiments, workers skilled in the art will recognize that changes may be made in form and detail without departing from the spirit and scope of the invention.

The invention claimed is:

1. A portable conveyor system for unloading material transport vehicles comprising:
   a frame having a first end, a second end, a first side and a second side, the frame configured for connection to a towing vehicle, the frame carrying a belt conveyor system generally from the first end to the second end, a portion of the frame adjacent to the first end configured to rest on a ground surface;
   a grate supported by the frame near the first end of the frame, the grate being positioned over a portion of the belt conveyor system;
   a first drive-over ramp pivotally connected to the first side of the frame adjacent to the grate;
   a second drive-over ramp pivotally connected to the second side of the frame adjacent to the grate;
   the first drive-over ramp, second drive-over ramp and grate capable of supporting a material transport vehicle for depositing material through the grate when the first and second drive-over ramps are in a first position, the first and second drive-over ramps capable of catching excess material deposited by the material transport vehicle, the first and second drive-over ramps pivotable to a second position to clear the excess material off of the ramps directly into the grate.

* * * * *